Patented Oct. 7, 1941

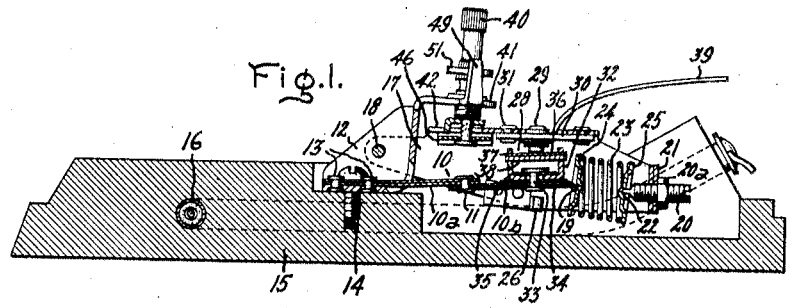
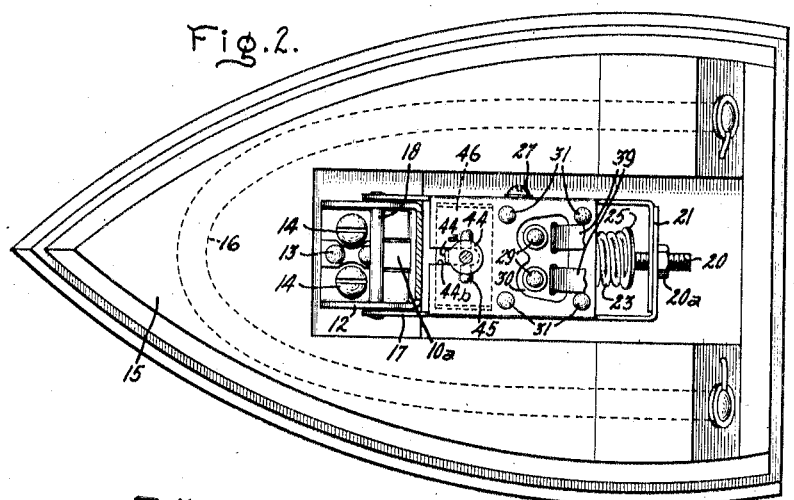
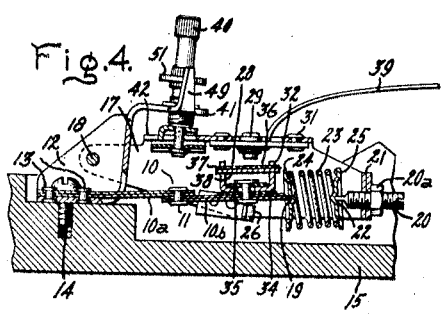
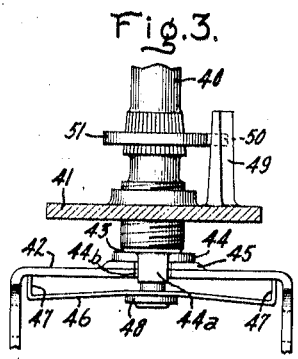
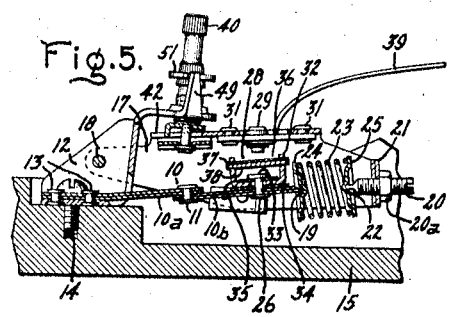

2,258,258

UNITED STATES PATENT OFFICE 2,258,258

CONTROL DEVICE

Peter L. Mikeska, Chicago, Ill., assignor to Edison General Electric Appliance Company, Inc., Chicago, Ill., a corporation of New York Application July 19, 1939, Serial No. 285,311

5 Claims. (Cl. 200—139)

This invention relates to temperature control devices and more particularly to devices for controlling an electric circuit in accordance with temperature changes.

More specifically, this invention relates to temperature control devices of the type described and claimed in United States Letters Patent 2,128,869 issued August 30, 1938 on an application filed by Russell A. Winborne and constitutes an improvement upon such control devices.

It is an object of my invention to provide in a control device of the aforementioned type an improved arrangement for obtaining an adjustable range of temperatures varying from an off position at normal temperatures to a predetermined maximum temperature position.

It is a further object of this invention to provide means for obtaining an adjustable range of temperatures which will accurately repeat its cycle of operation at different settings.

It is a further object of this invention to provide an adjusting means for varying the temperature setting of a control device, which is so constructed and arranged that temperature drift will be eliminated and accuracy in temperature calibration will be maintained over the entire range of adjustment.

Further objects and advantages of this invention will more fully appear as the following description proceeds and the features of novelty which characterize this invention will be pointed out with particularity in the appended claims.

For a more complete understanding of this invention, reference should be had to the accompanying drawing in which Fig. 1 is a vertical elevation mainly in section of the temperature control device embodying this invention shown as applied to an electrically heated flatiron; Fig. 2 is a plan view of the arrangement shown in Fig. 1; Fig. 3 is a fragmentary elevation partly in section showing details of the improved temperature adjusting arrangement of this invention; Fig. 4 is a vertical elevation showing the control device illustrated in Figs. 1 and 2 in a different controlling position; and Fig. 5 is a vertical elevation mainly in section showing the position of the elements of the control device embodying this invention when adjusted to an off position at normal or room temperatures.

Referring to Fig. 1 it will be observed that the temperature control device of this invention comprises a thermally responsive element 10 which is in the form of a compound bimetallic element having two sections 10a and 10b. Each section of the element 10 is made up of two strips of metal having dissimilar temperature coefficients of expansion such as Invar and nickel-chrome steel, these two strips being securely welded or brazed together lengthwise. The two sections of the thermally responsive element 10 are rigidly secured together by any suitable means, such as rivets 11, the section 10b being reversely arranged with reference to the section 10a so that it moves in a direction opposite to the direction of movement of the portion 10a in response to temperature changes, that is, when the portion 10a moves downwardly in response to a temperature increase, the portion 10b moves upwardly. The purpose of this compound blade construction is to reduce the amount of overshoot of the control device in the first cycle of operation thereof. Further details of construction of the compound blade and the manner in which it functions to reduce overshoot are fully described in the aforementioned Winborne patent.

The main supporting element of the control device comprises a metallic supporting base or frame 12 to which is rigidly secured by means of rivets 13 one end of the section 10a of the compound thermally responsive element. The rivets 13 are adapted to extend through suitable openings provided in the blade and the frame. The metallic support 12 with the thermally responsive member rigidly secured thereto is in turn firmly attached, by means of clamping screws 14, to the body 15, the temperature of which is to be controlled. As shown in Figs. 1 and 2, the body 15 constitutes the sole plate of an electrically heated flat iron. It is to be understood that a flat iron sole plate is shown merely for the purposes of illustration and it is not intended to limit my invention thereto since the control device of this invention may be used generally. As shown in Figs. 1 and 2, when the frame 12 is firmly secured to the body 15, the thermally responsive element is connected in direct thermal relation with the body so that it is directly heated by conduction when the body is heated. The body 15 is heated by an electric heating element 16 which may be of any suitable type but preferably will be of the sheathed wire type, such as described and claimed in United States Letters Patent 1,367,341 to C. C. Abbott, dated February 1, 1921.

Pivotally mounted on the frame 12 is the frame or yoke 17 which is adapted to pivot about the pin 18 which extends through the side walls of the frame 12 as shown in Fig. 2. The yoke 17 is adapted to pivot in a vertical plane for the reason which will more fully appear hereinafter.

In order to cause the thermal element 10 to be moved between two limiting positions quickly and with a snap action, a knife-edge bearing 19 is provided on the free end of the blade section 10b of the element 10. In addition, an adjusting screw 20 is threadedly mounted in the end 21 of the yoke 17 and is provided with a bearing surface 22. Extending between the knife-edge 19 and the bearing surface 22 is a resilient member which comprises a helically wound spring 23 extending between two cup members 24 and 25, each of the cup members being provided with a centrally arranged depression which is adapted to engage the knife-edge 19 and the bearing 22, respectively. A lock nut 20a is provided for locking the screw 20 in its adjusted position.

The spring 23 is constructed and arranged to exert a lateral thrust on the end of the thermally responsive element 10 which thrust tends to hold the element in either of its two limiting positions. Movement of the thermally responsive element in response to temperature changes is restrained by this lateral thrust until the energy stored up in the thermally responsive element is sufficient to overcome the thrust of the spring. When this occurs, the element 10 is quickly moved from one of its limiting positions to the opposite limiting position and is maintained in the opposite limiting position until the thermally responsive element is moved in the opposite direction a sufficient amount to cause snap action movement to its original limiting position. One limiting position of the thermally responsive element 10 is obtained by means of the stop 26 which is adjusted during the assembly of the component elements of the control device and, when once adjusted, is secured in its adjusted position by means of the screw 27 extending into one side wall of the yoke 17. This stop 26 serves to limit the downward movement of the thermally responsive element 10.

Carried by the thermally responsive element adjacent the free end of the section 10b of the element is a bridging contact assembly 28 which is adapted to engage a pair of fixed contacts 29 mounted in a plate 30 of suitable insulating material which plate is secured to the top wall of the yoke 17 by means of a plurality of rivets 31. The bridging contact assembly comprises a substantially U-shaped frame member 32 which is secured to the section 10b of the thermally responsive element 10 by means of a rivet 33, the U-shaped member 32 being insulated from the section 10b by means of a strip of suitable insulating material 34 and the head of the rivet 33 being insulated from the bracket 32 by means of the insulating strip 35. Mounted in the arms of the U-shaped bracket 32 is the bridging contact plate 36 which comprises a strip of precious metal 37 such as silver welded to a base metal backing strip 38 such as steel. It will be understood that the fixed contacts 29 are electrically connected by means of the leads 39 into the heating circuit for the device the temperature of which is to be controlled, so that when the bridging contact assembly 28 is in the position shown in Fig. 1, that is, when it is in position to bridge both fixed contacts, the heating circuit for the device being controlled will be completed whereas, when the bridging contact assembly 28 moves away from the fixed contacts 29, as shown in Figs. 4 and 5 the heating circuit will be opened. It is not deemed necessary to show the complete energizing circuit for the heating element 16 since this may have any suitable well-known arrangement. As far as this invention is concerned, it is merely necessary to state that the two fixed contacts 29 are connected in this energizing circuit so that when they are closed by the bridging contact plate 36, the heating unit is energized and when they are opened by removing the bridging contact plate 36, the heating unit is deenergized. It will be observed that the upward movement of the blade element 10 is limited by the engagement of the bridging contact plate 36 with the fixed contacts 29 which constitutes the second limiting position for element 10.

Considering the operation of the control device described thus far and assuming the elements to be in the position shown in Fig. 1, which is the closed position for the electrical contacts, the heating unit 16 is energized. As the body member 15 heats up, heat is conducted to the thermally responsive element 10 and the portion 10a thereof begins to deflect downwardly. As explained in the aforementioned Winborne patent, there is a noticeable time lag in the conduction of heat along the thermally responsive element and a temperature gradient exists between the fixed end of the portion 10a and the free end of the portion 10b. The portion 10a, therefore, is subjected to a materially higher temperature than the portion 10b. Under these circumstances, the compound blade on its first cycle of operation acts substantially the same as it would if the portions 10a and 10b were arranged in a similar manner. In other words, during the initial cycle of operation of the control device, the effect of the portion 10b of the blade element is negligible and the portion 10a deflects downwardly an amount sufficient to overcome the lateral thrust exerted by the spring 23. When this occurs, the whole element 10 is moved downwardly under the influence of the spring 23 quickly and with a snap action against the stop 26 thereby causing the bridging contact assembly 28 to be moved away from the fixed contacts 29.

Opening of the contacts 29 causes the unit 16 to be deenergized and the temperature of the body starts to decrease. However, during the initial cooling cycle, the compound blade element 10 attains a saturated temperature condition. That is, heat continues to flow in the element even though the unit 16 is deenergized until the temperature gradient along the element is substantially zero. As the compound blade element saturates, the portion 10b instead of curving farther and farther away from the fixed contacts 29, curves upwardly in the opposite direction toward the fixed contacts. Thus, when the portion 10a of the blade begins to reverse its curvature to move upwardly due to the continued cooling action of the body 15, the portion 10b will operate to advance the closure of the contacts 29. It will be observed, therefore, that the cumulative effect of the two upward deflections of the sections of the compound blade element causes a premature closing of the fixed contacts 29 during the first cycle of operation thereby reducing the temperature overshoot during this first cycle of operation as described in detail in the aforementioned Winborne patent.

As previously pointed out, this invention relates to an improvement upon the construction described and claimed in the aforementioned Winborne patent and the improvement relates particularly to means for obtaining temperature adjustment of the control device over a wide range which extends from an off position at room temperature to a predetermined high temperature position. With the control devices of the type described above, it is essential to have temperature adjusting means which will accurately maintain the temperature of the body being heated at the predetermined desired temperature without temperature drift, which will maintain its calibration, and which will accurately repeat its cycle of operation at different temperature settings. In accordance with this invention I have provided means for achieving these results simply and at low cost.

As was pointed out above, the yoke member 17 is pivotally mounted on the frame 12 and is adapted to pivot in a vertical plane about the shaft 19 mounted in the frame. In accordance with this invention, a range of temperatures is obtained by moving the yoke 17 relative to the frame 12. It will be observed that movement of the yoke causes the position of the bearing point 22 to be shifted vertically relative to the blade 10 thereby increasing or decreasing the lateral thrust exerted on the compound blade element 10 by the spring 23 and altering the contact pressure between the fixed and movable contact assembly so that greater or less movement of the blade 10 is required to open or close the contacts, as the case may be.

In order to adjust the position of the yoke member 17 there is provided an adjusting screw 40 which is threadedly mounted in the integrally formed flange 41 provided on the frame 12. As shown in Fig. 3, the end of the adjusting screw 40 is adapted to extend through the top wall 42 of the yoke 17 and provided on the adjusting screw adjacent the yoke member 17 is a shoulder 43 which is adapted to bear against a case hardened friction disk 44 which lies between the shoulder 43 and the top wall 42 of the yoke. The case hardened friction disk 44 is provided to eliminate wear when turning the adjusting screw relative to the yoke. In order to insure linear movement of the yoke, the top surface thereof under the friction washer 44 is embossed upwards at 45 to prevent the edges of the friction washer from striking the yoke due to the latter's angular movement. To prevent turning of the friction washer relative to the yoke and the adjusting screw, it is provided with a depending leg or tang 44a which engages a slot 44b in the top wall 42 of the yoke.

It has been found that one of the chief causes of erratic operation of a control device of the type described is the fact that drag of the leads 39 tends to cause the pivotally mounted yoke to float free of the adjusting screw. In order to prevent such a separation of the yoke and adjusting screw and to improve the accuracy of the control device, there is provided in accordance with this invention a resilient member which engages the under surface of the yoke and biases it upwardly so that the friction disk 44 is always maintained in contact with the shoulder 43 of the adjusting screw on one side and in contact with the bosses 45 on the opposite side. The resilient member comprises a substantially U-shaped spring member 46 having leg portions 47 which are adapted to bear against the under surface of the yoke so as to permit flexing of the span portion of the U-spring. The lower end of the adjusting screw is adapted to extend through an opening provided in the span portion of the U-spring and a washer 48 is secured in position on the end of the adjusting screw so as to hold the spring 46 in assembled relation with respect to the yoke 17. Due to the fact that the thermally responsive element 10 is of the compound blade construction and it is a characteristic of such a blade construction that the blade deflection for a given temperature change is lessened appreciably without change in blade dimensions, the stress in the blade during operation of the device is reduced making it possible to employ a spring similar to the spring 46 for biasing the yoke member against the shoulder of the adjusting screw.

By means of the construction described thus far, it will be observed that the rotation of the adjusting screw clockwise causes the shoulder 43 provided thereon to be moved downwardly to cause a similar movement of the yoke member 17. Downward movement of the yoke effects a similar movement of the bearing 22 to cause the spring member 23 to be pivoted about the bearing point 22 so as to increase the lateral thrust exerted by the spring member on the knife-edge 19. This causes the contact pressure between the movable contact 28 and the fixed contacts 29 to be increased thus requiring a greater movement of the thermally responsive element 10 in order to open the contacts and hence producing a higher temperature setting for the device. Conversely, when the adjusting screw is rotated counterclockwise, the shoulder 43 of the adjusting screw moves upwardly and, due to the force exerted by the spring 46, the yoke 17 also is caused to move upwardly, the friction washer 44 being firmly held against the shoulder 43 of the adjusting screw. Upward movement of the yoke causes the bearing point 22 to be moved upwardly so as to decrease the lateral thrust exerted by the spring 23 on the knife-edge 19 of the thermally responsive element 10. The contact pressure between the movable contact 28 and the fixed contacts 29 is decreased therefore and less movement of the thermal element 10 is required to open the contacts thereby producing a lower temperature setting for the device.

In order to limit the rotational movement of the adjusting screw and to provide a range of temperatures over which the control device operates, there is integrally formed on the flange 41 a stop bracket 49 which is adapted to be engaged by an arm 50 formed on a disk 51 which is firmly mounted on the adjusting screw 40 so as to be stationary relative to the adjusting screw. The disk 51 is mounted on the adjusting screw so that when the arm 50 provided thereon engages the bracket 49 so as to limit the clockwise movement of the adjusting screw, the control device will be set to maintain a maximum temperature and when the arm 50 engages the bracket 49 so as to limit the counterclockwise movement of the adjusting screw, the control device will be in an off position at normal room temperatures. Fig. 1 shows the adjusting screw rotated so as to set the control device at its maximum temperature and Fig. 5 shows the control device rotated in a counterclockwise direction so that the contacts are open at normal room temperatures. It is thus apparent that I have provided a range of operation for the control device extending from a manually settable off position at normal room temperatures to a predetermined maximum temperature setting. Any temperature between the off position temperature and the maximum temperature may be selected and, due to the manner in which the adjusting screw is connected to the yoke member, the temperature selected will be accurately maintained without the occurrence of temperature drift and, in addition, due to the force exerted by the spring 46 on the yoke member 17, the yoke will be positively located for every setting of the adjusting screw thereby producing improved snap action of the contacts and insuring accurate repetition of the cycle of operation of the control device at different temperature settings of the device.

From the foregoing description it is apparent that I have provided an improved control device having improved means for adjusting and setting the temperature at which the control device operates, the improved means being adjustable over a range of conditions including a manually settable off position at normal room temperatures which permits the use of the control device as an on and off switch. It will also be observed that I have provided a rugged and simplified construction for obtaining and adjusting the temperature of a control device and one which functions to maintain the calibration of the control device throughout its life.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In a temperature control device for an electrically heated appliance, a support, a yoke pivotally mounted on said support, a compound bimetallic blade element having one end fixed on said support and the opposite end free to move, resilient means pivotally mounted on said yoke and bearing on said free end of said bimetallic blade so as to cause said blade to be moved quickly and with a snap action between two limiting positions, circuit controlling means associated with said blade and said yoke adapted to 'e actuated by movement of said compound blade, and means for controlling the temperature at which said circuit controlling means are actuated over a range extending from a manually settable off position at normal temperatures to a predetermined maximum temperature position, said means comprising an adjusting screw mounted in said stationary support and engaging the upper surface of said yoke member, and resilient means bearing against the under surface of said yoke member and biasing said yoke member against said adjusting screw throughout its range of adjustments.

2. In a control device having a stationary support, a compound bimetallic blade element secured to said support, a yoke member pivotally mounted on said support and pivotally supported resilient means extending between the end of said compound blade element and said yoke member to cause said blade element to be actuated with a snap action between two circuit controlling positions, means for adjusting the position of said yoke member relative to said blade element to control the temperature at which said blade element moves from one circuit controlling position to another, said means comprising an adjusting screw threadedly mounted in said support and having one end extending through said yoke member, a shoulder on said adjusting screw lying above the upper surface of said yoke, a friction washer on said adjusting screw and lying between said shoulder and said upper surface of said yoke member, resilient means for maintaining said yoke member against said friction washer and said friction washer against said shoulder in all positions of said adjusting screw, and means for limiting the movement of said adjusting screw in both the clockwise and counterclockwise direction, said limiting position of said adjusting screw in a clockwise direction corresponding to a maximum temperature setting for said control device and said limiting position for said adjusting screw in a counterclockwise direction corresponding to an off position of said control device at normal temperatures.

3. In an arrangement for adjusting the conditions under which a temperature control device operates, a stationary support, a yoke pivotally mounted on said support, an adjusting screw threadedly mounted in said support and having one end extending through said yoke, a shoulder on said adjusting screw lying above said yoke, and resilient means extending between said end of said adjusting screw and the under side of said yoke for biasing said yoke toward said shoulder in all positions of said adjusting screw.

4. In a temperature adjustment arrangement for a temperature control device, a stationary support, a yoke pivoted on said support, an adjusting screw mounted in said support and adapted to bear against said yoke so as to vary the position of said yoke so that the temperature at which said control device operates may be varied from an off position at normal temperatures to a predetermined maximum temperature position, and resilient means bearing against said yoke and biasing said yoke against said adjusting screw throughout the range of adjustment thereof.

5. In an arrangement for adjusting the temperature of a temperature control device over a range of temperatures varying from an off position for said control device at normal room temperatures to a predetermined maximum temperature setting comprising a stationary support, a yoke pivotally mounted on said support and adapted to be pivoted with respect thereto to vary the temperature setting of the control device, and means for varying the position of said yoke, said means comprising an adjusting screw rotatably mounted in said stationary support and having one end extending through said yoke member, means for transmitting the vertical movement of said adjusting screw to said yoke member, and resilient means lying between the under side of said yoke member and the end of said adjusting screw for biasing said yoke member against said transmission means over the entire range of operation of said temperature adjusting means.

PETER L. MIKESKA.